No. 809,833. PATENTED JAN. 9, 1906.
G. MOTHES.
APPARATUS FOR THE PRODUCTION OF GLOBOIDAL WORM WHEELS.
APPLICATION FILED SEPT. 3, 1901.
2 SHEETS—SHEET 1.
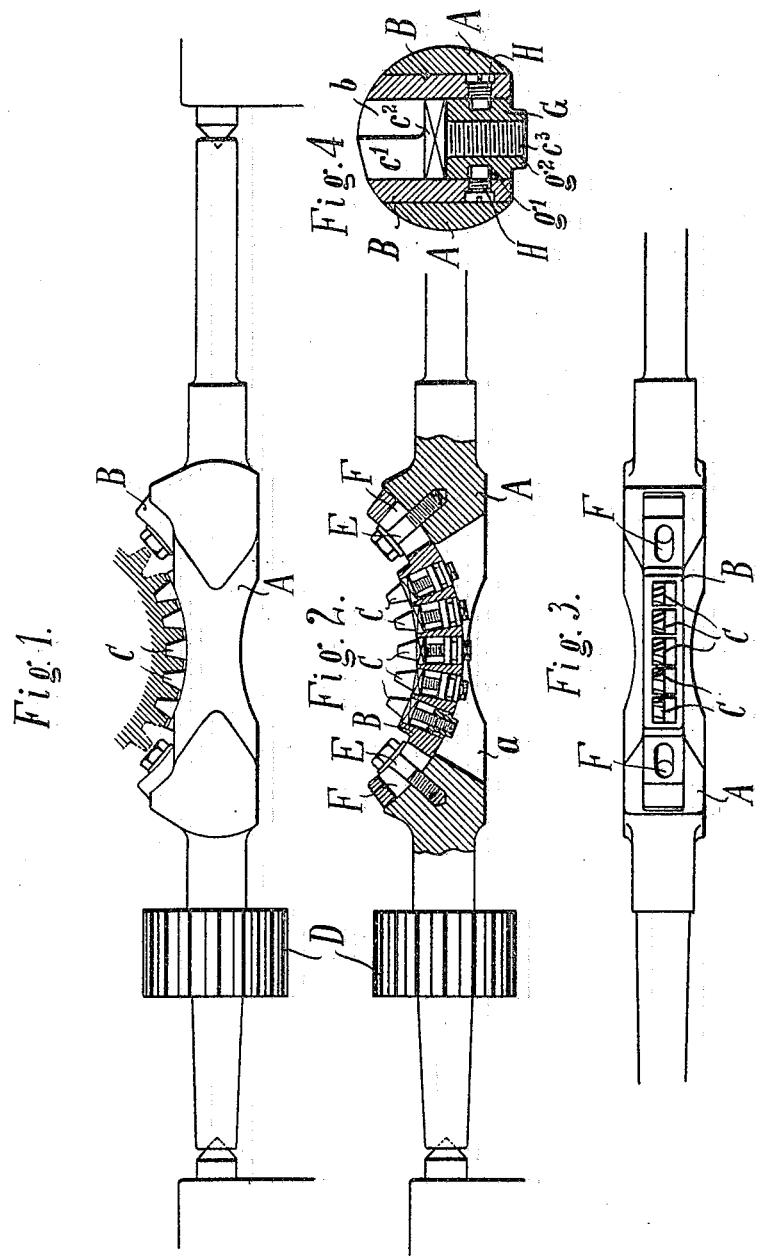

No. 809,833. PATENTED JAN. 9, 1906.
G. MOTHES.
APPARATUS FOR THE PRODUCTION OF GLOBOIDAL WORM WHEELS.
APPLICATION FILED SEPT. 3, 1901.
2 SHEETS—SHEET 2.
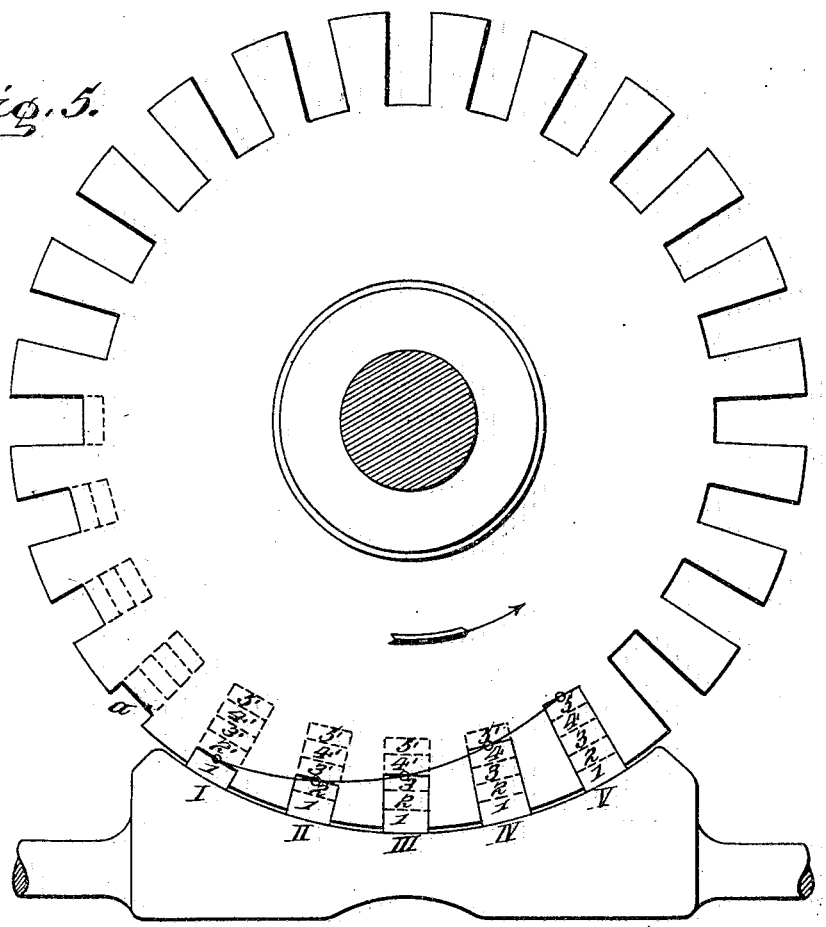
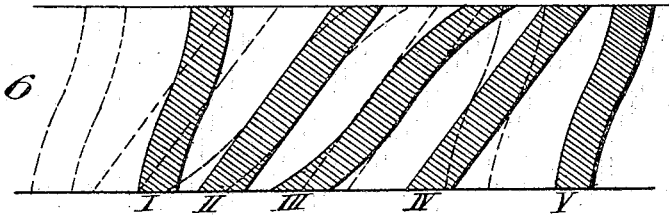
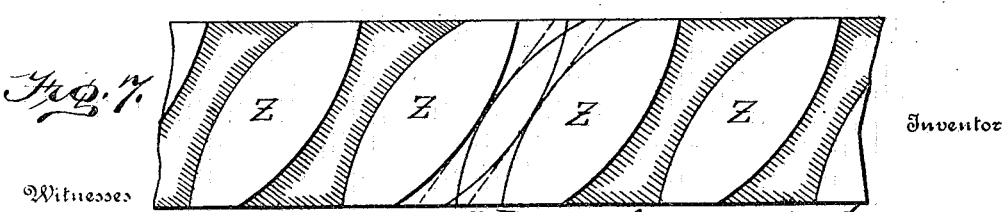
Witnesses
H. G. Dieterich
H. H. Simms
Inventor
By Georg Mothes
Knight Bros
Attorneys

UNITED STATES PATENT OFFICE.

GEORG MOTHES, OF RÜTTENSCHEID, NEAR ESSEN-ON-THE-RUHR, GERMANY, ASSIGNOR TO FRIED. KRUPP, OF ESSEN-ON-THE-RUHR, GERMANY.

APPARATUS FOR THE PRODUCTION OF GLOBOIDAL WORM-WHEELS.

No. 809,833. Specification of Letters Patent. Patented Jan. 9, 1906.

Application filed September 3, 1901. Serial No. 74,141.

*To all whom it may concern:*

Be it known that I, GEORG MOTHES, engineer, residing at 40 Andreasstrasse, Rüttenscheid, near Essen-on-the-Ruhr, Germany, have invented certain new and useful Improvements in Apparatus for the Production of Globoidal Worm-Wheels, of which the following is a specification.

The present invention relates to the production of globoidal worm-wheels; and it consists specifically in an apparatus for carrying out the process described in my application filed of even date herewith, whereby it is possible to construct teeth on a globoidal worm-wheel which approach within the desired degree of accuracy to theoretically-correct teeth.

Heretofore in making globoidal worm-wheels cutters have mostly been used which are of the form of the globoidal worm and are constructed in a single piece. By using such cutters the feed must be effected perpendicularly to the axis of rotation by advancement of either the tool or the work-piece, and they are available not universally, but only in cases where in consequence of the restricted length of the globoidal worm and particular shape of screw-thread selected there is no undercut in the sides of the teeth, but in a case where it is required to have the worm cover a greater area of the worm-wheel, in which case greater advantages arise from the use of the globoidal worm instead of the common form of worm, it is impossible to construct the globoidal worm-wheel by means of a cutter having the form peculiar to the finished globoidal worm.

By the process described in my copending application and the apparatus which forms the subject of the present invention it becomes possible to cut teeth theoretically correct to the desired degree of accuracy in a globoidal worm-wheel for every form of globoidal worm and without the use of a cutter of the form of the finished globoidal worm.

The accuracy and success of the apparatus are based upon the following considerations: If one contemplates a number of planes through the axis of the globoidal worm, the sectional profiles of the worm thus produced all differ one from another. The profile of the screw-threads of every section is with regard to its neighboring section advanced a fraction of a pitch on the worm. The extent of this difference is naturally dependent on the angles of the respective planes, and, *e. g.*, for an angle of one hundred and eighty degrees equals a half-pitch and for ninety degrees a quarter-pitch. Now since all the different axial sections of the globoidal worm in the course of one revolution of the latter come into engagement with the globoidal worm-wheel it is evident that to accomplish theoretically-correct teeth an infinite number of cuts to agree with the sectional profiles would have to be made into the rim; but by making a sufficient number of cuts a tooth may be obtained that approaches sufficiently near to theoretical correctness to answer practical purposes. In other words, the worm-wheel blank is cut first to provide grooves which correspond to the working portions of the globoidal worm which would be in engagement with the globoidal worm-wheel at one time, and the grooves thus formed are then cut to correspond with other working portions of the worm which would be in engagement with said wheel at another time.

The new apparatus will now be described with reference to the accompanying drawings, in which—

Figure 1 is a plan view. Fig. 2 is a horizontal section. Fig. 3 is a side view of the apparatus; Fig. 4, a detail view, on an enlarged scale; and Figs. 5 to 7 are diagrammatic views.

The apparatus for cutting globoidal worm-wheels consists, essentially, of a tool-carrier A, a bit-holder B, and a number of adjustable profile-cutting bits C.

The tool-carrier A has the form of a shaft, which has a reinforced flat middle portion. It is suspended between centers or otherwise in the machine which serves for manipulating it in cutting globoidal worm-wheels and through the medium of a splined pinion D has imparted to it a rotation positively depending on the rotation of the work-piece and corresponding to the rotation which the finished globoidal worm-wheel receives when in use. The proportions of the tool-carrier must naturally, as will be seen from the drawings, be so determined that it will not interfere with the work-piece in turning. For this purpose the center of the tool-carrier A, which lies in the immediate vicinity of the work-piece, must be of the shape of the core of the finished globoidal worm.

In a recess of the tool-carrier, concentric with the circumference of the globoidal worm-wheel, is adjustably mounted a correspondingly-curved bit-holder B. For securing the latter in any desired position two screws E are inserted in the tool-carrier, which screws pass through slots F in the bit-holder. The length of the slots F is so regulated that the bit-holder may be shifted through an arc corresponding to the pitch, it being shown in the drawings in the middle position. The bit-holder serves for the reception of a row of cutting-bits C, the number of which corresponds to the number of spaces between the teeth of the globoidal worm-wheel which are to be in engagement with the globoidal worm at any one time. There are five of these shown in the drawings. Each bit (see Fig. 4) consists of a cutting part proper, $c'$, whose trapezoidal profile corresponds to that of the screw-threads of the globoidal worm, also a rectangular guiding-shank $c^2$ and the threaded shank $c^3$, by means of which the advancement of the bit is effected. The several bits lie in radial perforations of the bit-holder, the space between these perforations naturally depending upon the pitch. The inner part of each perforation $b$, extending toward the center of the curve of the bit-holder, is used as a guide for the guiding-shank $c^2$ and is likewise rectangular and of such depth that the cutting portion $c'$ can be fully retracted within the bit-holder, while the remaining outwardly-extending portion of the opening $b$ is bored cylindrically. In the latter part is located a cylindrical nut G, provided with an exterior annular recess $g'$, which nut is screwed upon the threaded shank $c^3$ and may be rotated. A movement of the nut in an axial direction is prevented, however, by two set-screws H, which are screwed into the wall of the bit-holder from the outside and enter the annular recess $g'$ of the nut. By turning the nut G by means of a key applied to the rectangular portion $g^2$ of the same the bit C can be adjusted out of or into the bit-holder. In the innermost position the threaded shank $c^3$ is screwed fully into the nut G. In the outermost position several turns of the thread still remain in engagement with the nut. In order that the several nuts for adjustment of the cutting-bits may be accessible from without, the tool-holder is provided with a broad slot $a$.

It will thus be seen that the invention employs a rotating tool the axis of rotation of which during the entire course of the work bears the same relation to the axis of the worm-wheel to be cut as the axis of the appurtenant globoidal worm bears to said worm-wheel axis during driving action, and by this means there is made in the periphery of the wheel any number of cuts, (corresponding to the degree of accuracy desired,) which are of the form of longitudinal sections at different angles through the axis of the appurtenant globoidal worm. In accomplishing this the tool and the work-piece are compelled to rotate in a relation corresponding to that of the members of the globoidal worm-gearing when in use, and the position of the sectional profile represented by the cutting edges of the tool with respect to the worm-wheel to be cut is the same as that of the corresponding axial section of the globoidal worm when in use.

The cutting of the globoidal worm-wheel by means of the above-described apparatus is accomplished in the following manner: The work-piece and the tool-carrier are suspended in the machine, the cutting-bits are arranged in the bit-holder in their inner position, and the bit-holder may, for example, assume the central position shown in the drawings. After the cutting-bits have been advanced for the thickness of a chip toward the work-piece the machine is set in operation. When the tool-carrier rotates on its axis, all the bits will each cut a groove of depth 1 (see Fig. 5) out of the rim of the wheel-blank. As the cutting edges of the outer bits are at a greater distance from the axis of the tool-carrier than the cutting edges of the middle bits, the outer bits revolve quicker than the middle bits. The worm-wheel rotates in unison and freely with the tool-carrier, so that the single grooves cut in the rim of the blank by bits I V are of different shapes, as is shown in Fig. 6. The rotation of the wheel-blank is such that during the first step the tool-carrier has turned once over a part of the wheel. In consequence when the bits II V, after the first cut and following first rotation of the tool-carrier, again reach the wheel-surface there is no more full material to be found but the groove made by the first cut of the bits I V. On this second cut, (shown in Fig. 6 in dotted line,) which crosses the grooves made in the first cut, the bits will have to take away less material of depth 1, so the machine (in the construction shown) is stopped and without overwork the bits II V may be advanced one chip. They will then occupy the position 2. (See Fig. 5.) Bit I will find full material on every revolution of the tool-carrier until it reaches the groove made by the bit V in the first cut. By the second cut the bits will occupy the places 1 2 2 2 2, Fig. 5. On the third cut bit II will meet with a groove made by bit I from depth 1 on the second revolution of the tool-carrier and can therefore not be advanced, as it would have to be passed through two depths. The bits III V will each meet with a groove made by bits II IV of depth 2 and can therefore all be advanced one depth. The bits I V will now have positions 1 2 3 3 3. On the fourth cut the bit III will meet with a groove of depth 2 made by bit II on the third revolution of the tool-carrier and is therefore not advanced. Bits IV V, however, each meet with a groove made by bits III IV of depth 3, and therefore are advanced, the bits on the fourth cut occupying the positions 1 2 3 4 4. On the fifth cut the bit IV is not advanced, as it will meet with a groove made by bit III of depth 3; but bit V meets with a groove made by bit IV of depth 4 and is advanced. The bits I V have now positions 1 2 3 4 5. The bits retain the positions given on the last advance on further cutting until they meet with the grooves $a$, Fig. 5, made in the first cut by bit V of depth 1. Bit I can thus before the beginning of the n-4th cut be advanced one depth and take then the position marked in Fig. 5 with 2'. The bits II V are not advanced. The bits will by the n-4th cut occupy the positions 2' 2 3 4 5. It is now easily seen from Fig. 5 that the positions of the bits are: After n-3rd cut 3' 3' 3 4 5. After n-2nd cut 4' 4' 4' 4 5. After n-1st cut 5' 5' 5' 5' 5. If all the grooves are cut in the full depth in the wheel by the cut they will give in their collectiveness a space between the teeth somewhat like Fig. 7, the standing teeth of the worm-wheel being marked with $z$. There has now been cut in the rim of the wheel a groove corresponding to the working portion of the globodial worm-wheel which would be in engagement with the globoidal worm-wheel at one time, and, as before stated, to obtain correct teeth a number of cuts must be made. A second cut, which, for example, corresponds to a section through the axis of the globoidal worm at an angle of one hundred and eighty degrees from the first, is now begun. For this purpose the machine is stopped and the bit-holder is shifted in the tool-carrier by means of slots F and screws E through the distance of the angle corresponding to the half-pitch to the right or to the left. Thereupon the driving connections of the tool-carrier are uncoupled from the driving connections of the work-piece, and while the work-piece stands still the tool-carrier is turned one hundred and eighty degrees to destroy the relation between the worm-wheel and the bits and the coupling of the driving connections again restored. The cutting of the grooves proceeds in the same manner as previously set forth. If now a sectional profile corresponding to a section through the axis of the globoidal worm at an angle of ninety degrees from the preceding one is to be produced, it is obvious that the tool-carrier must be turned ninety degrees and the bit-holder shifted for an angle corresponding to a quarter-pitch. If the angle which the plane of the section makes with that of the previous section is represented by $x$ and the pitch is designated by $t$, then the extent of adjustment of the bit-holder in the arc will be indicated by $\frac{tx}{360}$, while the turning of the tool-holder must naturally be X°. The direction in which the tool-carrier is to be rotated and the direction in which the bit-holder is to be shifted depend upon the direction in which the angle $x$ is reckoned—that is to say, whether the globoidal worm to be employed with the worm-wheel is right-handed or left-handed—and may be obtained through a simple consideration without further explanation.

A greater or lesser number of cuts corresponding to the sectional profiles of the globoidal worm are made in the periphery of the worm-wheel, according to the desired degree of accuracy. In many cases the cutting of four perpendicularly-arranged sections will give ample exactness to the teeth of the worm-wheel.

As will be readily observed, by the use of two tools two different cuts may be made in the wheel upon different sides of the work-piece diametrically opposite and the manufacture of worm-wheels thus rendered more rapid. Moreover, in globoidal worms of sufficiently large diameter upon which the dimensions of the tool-carrier depend there could be arranged in one and the same tool-carrier more than one bit-holder, and in this manner more than one profile cut simultaneously.

It is to be understood that I do not desire to be limited to the radially-adjustable cutters and that I wish to claim broadly a construction by which grooves are cut into the worm-wheel blank to correspond to working portions of the globoidal worm which would be in engagement with the globoidal worm at one time, and the grooves thus formed are cut to correspond with other working portions of the worm which would be in engagement with said wheel at another time.

I claim—

1. The combination of a rotatable tool-carrier provided with a lateral and an arcuate recess, a bit-holder, means securing the bit-holder in the arcuate recess and to the tool-carrier and radially-adjustable cutters disposed radially in an arc on the bit-holder and controllable for adjustment by way of the lateral recess.

2. In a rotary tool for constructing globoidal worm-wheels, a plurality of cutting-bits arranged and shiftable in an arc concentric with the circumference of the wheel to be cut.

3. The combination with the tool-carrier, of a plurality of radially-positioned cutting-bits forming and shiftable in an arc.

In testimony whereof I have hereunto set my hand in the presence of two subscribing witnesses.

GEORG MOTHES.

Witnesses:
 CHAS. L. COLE,
 PAUL ARRAS.